(12) United States Patent
Knisely (10) Patent No.: US 8,532,658 B2
(45) Date of Patent: Sep. 10, 2013

(54) NEIGHBOR LIST PROVISION IN A COMMUNICATION NETWORK

(75) Inventor: Douglas Norman Knisely, Wheaton, IL (US)

(73) Assignee: Airvana Network Solutions, Inc., Chelmsford, MA (US)

( * ) Notice: Subject to any disclaimer, the term of this patent is extended or adjusted under 35 U.S.C. 154(b) by 804 days.

(21) Appl. No.: 11/641,588

(22) Filed: Dec. 19, 2006

(65) Prior Publication Data

US 2008/0146232 A1 Jun. 19, 2008

(51) Int. Cl.
*H04W 36/00* (2009.01)

(52) U.S. Cl.
USPC .......................................... 455/436; 370/331

(58) Field of Classification Search
USPC ................. 455/436–444; 370/331–334, 328, 370/338
See application file for complete search history.

(56) References Cited

U.S. PATENT DOCUMENTS

| | | | |
|---|---|---|---|
| 6,188,904 B1 * | 2/2001 | Marsan | 455/450 |
| 6,295,450 B1 * | 9/2001 | Lyer et al. | 455/436 |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,356,001 B1 * | 4/2008 | Jones et al. | 370/331 |
| 7,475,048 B2 * | 1/2009 | Weston et al. | 706/20 |
| 7,558,356 B2 | 7/2009 | Pollman et al. | |
| 7,558,588 B2 | 7/2009 | To et al. | |
| 7,623,866 B1 * | 11/2009 | Spitzer | 455/442 |
| 2002/0055999 A1 * | 5/2002 | Takeda | 709/224 |
| 2002/0059453 A1 * | 5/2002 | Eriksson et al. | 709/238 |
| 2002/0098849 A1 * | 7/2002 | Bloebaum et al. | 455/456 |
| 2002/0151304 A1 * | 10/2002 | Hogan | 455/436 |
| 2002/0191573 A1 * | 12/2002 | Whitehill et al. | 370/338 |
| 2002/0196749 A1 | 12/2002 | Eyuboglu et al. | |
| 2003/0013443 A1 * | 1/2003 | Willars et al. | 455/432 |
| 2003/0100311 A1 | 5/2003 | Chung et al. | |
| 2003/0174667 A1 * | 9/2003 | Krishnamurthi et al. | 370/328 |
| 2003/0197724 A1 * | 10/2003 | Reed | 345/738 |

(Continued)

FOREIGN PATENT DOCUMENTS

| | | |
|---|---|---|
| GB | 2322051 | 8/1998 |
| GB | 2452688 | 3/2009 |
| WO | WO 03079700 | 9/2003 |
| WO | WO2008/077008 | 6/2008 |

OTHER PUBLICATIONS

International Preliminary Report on Patentability for PCT application No. PCT/US2007/087862 mailed Jul. 2, 2009 (8 pages).

(Continued)

*Primary Examiner* — George Eng
*Assistant Examiner* — Marcus Hammonds
(74) *Attorney, Agent, or Firm* — Fish & Richardson P.C.

(57) ABSTRACT

Techniques for neighbor list provision in a communication network are described. From an access terminal, a query for potential access points within communication range of the access terminal is received; and neighbor list information is provided to the access terminal. The neighbor list information is associated with available access points capable of providing the access terminal with access to a network.

23 Claims, 5 Drawing Sheets

(56) References Cited

U.S. PATENT DOCUMENTS

| | | | |
|---|---|---|---|
| 2003/0227911 A1* | 12/2003 | Trossen | 370/352 |
| 2004/0019636 A1* | 1/2004 | St. Pierre et al. | 709/203 |
| 2004/0043769 A1* | 3/2004 | Amerga et al. | 455/437 |
| 2004/0106408 A1* | 6/2004 | Beasley et al. | 455/436 |
| 2004/0116110 A1* | 6/2004 | Amerga et al. | 455/422.1 |
| 2004/0152480 A1* | 8/2004 | Willars et al. | 455/513 |
| 2004/0157600 A1* | 8/2004 | Stumpert et al. | 455/432.1 |
| 2005/0014492 A1* | 1/2005 | Kang et al. | 455/418 |
| 2005/0048974 A1* | 3/2005 | Kim et al. | 455/436 |
| 2005/0118946 A1* | 6/2005 | Colban et al. | 455/3.06 |
| 2005/0141464 A1* | 6/2005 | Willey et al. | 370/337 |
| 2005/0213555 A1 | 9/2005 | Eyuboglu et al. | |
| 2005/0243749 A1 | 11/2005 | Mehrabanzad et al. | |
| 2005/0243870 A1* | 11/2005 | Balogh et al. | 370/522 |
| 2005/0245279 A1 | 11/2005 | Mehrabanzad et al. | |
| 2005/0255847 A1* | 11/2005 | Han et al. | 455/436 |
| 2006/0067422 A1 | 3/2006 | Chung | |
| 2006/0067451 A1 | 3/2006 | Pollman et al. | |
| 2006/0092890 A1* | 5/2006 | Gupta et al. | 370/338 |
| 2006/0126509 A1 | 6/2006 | Abi-Nassif | |
| 2006/0142027 A1* | 6/2006 | Krishnamurthi et al. | 455/457 |
| 2006/0159045 A1 | 7/2006 | Ananthaiyer et al. | |
| 2006/0183482 A1* | 8/2006 | Ueda | 455/439 |
| 2006/0240782 A1 | 10/2006 | Pollman et al. | |
| 2006/0270411 A1* | 11/2006 | Grayson | 455/444 |
| 2006/0274743 A1* | 12/2006 | Yegin et al. | 370/389 |
| 2006/0291420 A1 | 12/2006 | Ng | |
| 2006/0294241 A1 | 12/2006 | Cherian et al. | |
| 2007/0005602 A1* | 1/2007 | Campadello | 707/10 |
| 2007/0026421 A1 | 2/2007 | Rao | |
| 2007/0050360 A1* | 3/2007 | Hull et al. | 707/6 |
| 2007/0050419 A1* | 3/2007 | Weyl et al. | 707/200 |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0211675 A1* | 9/2007 | Jain et al. | 370/338 |
| 2007/0220573 A1 | 9/2007 | Chiussi et al. | |
| 2007/0230419 A1 | 10/2007 | Raman et al. | |
| 2007/0237142 A1* | 10/2007 | Yang et al. | 370/390 |
| 2007/0238442 A1 | 10/2007 | Mate et al. | |
| 2007/0238476 A1 | 10/2007 | Sharma et al. | |
| 2007/0242648 A1 | 10/2007 | Garg et al. | |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0014991 A1* | 1/2008 | Laroia et al. | 455/561 |
| 2008/0049702 A1* | 2/2008 | Meylan et al. | 370/342 |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1* | 3/2008 | Mate et al. | 455/414.2 |
| 2008/0117842 A1 | 5/2008 | Rao | |
| 2008/0117866 A1* | 5/2008 | Claussen et al. | 370/329 |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2008/0253550 A1 | 10/2008 | Ch'ng et al. | |
| 2008/0254792 A1 | 10/2008 | Ch'ng | |
| 2009/0034440 A1 | 2/2009 | Samar et al. | |
| 2009/0082020 A1 | 3/2009 | Ch'ng et al. | |
| 2009/0088155 A1 | 4/2009 | Kim | |
| 2009/0116445 A1 | 5/2009 | Samar et al. | |
| 2009/0154447 A1 | 6/2009 | Humblet | |
| 2009/0156165 A1 | 6/2009 | Raghothaman et al. | |
| 2009/0156195 A1 | 6/2009 | Humblet | |
| 2009/0156218 A1 | 6/2009 | Garg et al. | |
| 2009/0163202 A1 | 6/2009 | Humblet et al. | |
| 2009/0163216 A1 | 6/2009 | Hoang et al. | |
| 2009/0163238 A1 | 6/2009 | Rao et al. | |
| 2009/0164547 A1 | 6/2009 | Ch'ng et al. | |
| 2009/0168766 A1 | 7/2009 | Eyuboglu et al. | |
| 2009/0168788 A1 | 7/2009 | Den et al. | |
| 2009/0170440 A1 | 7/2009 | Eyuboglu et al. | |
| 2009/0170475 A1 | 7/2009 | Ch'Ng et al. | |
| 2009/0170520 A1 | 7/2009 | Jones | |
| 2009/0170547 A1 | 7/2009 | Raghothaman et al. | |
| 2009/0170557 A1* | 7/2009 | Chauhan et al. | 455/552.1 |
| 2009/0172169 A1 | 7/2009 | Ch'Ng et al. | |
| 2009/0172397 A1 | 7/2009 | Kim | |
| 2009/0252136 A1* | 10/2009 | Mahany et al. | 370/338 |
| 2009/0323680 A1* | 12/2009 | Kubler et al. | 370/352 |

OTHER PUBLICATIONS

Paul Bender, et al., "CDMA/HDR: A Bandwidth-Efficient High-Speed Wireless Data Service for Nomadic Users", IEEE Communications Magazine, Jul. 2000.

Paul Bender & Ramin Rezaifar, "Draft Baseline Text for the 1xEV-DO Upper Layers (excluding Physical Layer)", 3GPP2, Aug. 17, 2000.

3GPP2, "3GPP2 Access Network Interfaces Interoperability Specification 2, Release A," Jun. 2000.

TIA/EIA/TSB-115, "Wireless IP Architecture Based on IETF Protocols", Jun. 6, 2000.

3GPP2, "Wireless IP Network Standard", 3rd Generation Partnership Project 2 (3GPP2), Version 1.0.0, Jul. 14, 2000.

3rd Generation Partnership Project "3GPP2", cdma2000 High Rate Packet Data Interface Specification, C.S0024-A, version 4.0, Oct. 25, 2002.

3rd Generation Partnership Project "3GPP2", cdma2000 High Rate Packet Data Interface Specification, C.S0024-A, version 2.0, Jul. 2005.

3rd Generation Partnership Project 2 "3GPP2", "cdma2000 High Rate Packet Data Interface Specification", C.S0024, version 2, Oct. 27, 2000 (441 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

International Search Report and Written Opinion in corresponding PCT application No. PCT/US2007/087862 mailed Apr. 22, 2008 (67 pages).

Liebsch, et al., "Request for Comments: 4066, Candidate Access Router Discovery (CARD)", Jul. 2005, URL: ftp://ftp.isi.edu/in-notes/rfc4066.txt, retrieved Apr. 3, 2008.

"3GPP2 C.S0024-A, cdma2000 High Rate Packet Data Air Interface Specification", Sep. 2006, URL: http://www.3gpp2.org/Public_html/specs/alltsgscfm.dfm, retrieved Apr. 2, 2008.

* cited by examiner

NEIGHBOR LIST PROVISION IN A COMMUNICATION NETWORK

TECHNICAL FIELD

This description relates to neighbor list provision in a communication network.

BACKGROUND

Cellular wireless communications systems, for example, are designed to serve many access terminals distributed in a large geographic area by dividing the area into cells. At or near the center of each cell, an access point, also referred to as a base transceiver station, is located to serve access terminals (e.g., cellular telephones, laptops, PDAs) located in the cell. Each cell is often further divided into sectors by using multiple sectorized antennas. In each cell, an access point serves one or more sectors and communicates with multiple access terminals in its cell.

When connecting to a network, an access terminal selects an access point from a list of available access points that are known to be within communication range. The access terminal obtains the list of available access points from "neighbor list information" stored in its memory. In general, neighbor list information includes the set of radio channels (e.g., radio access technology, band classes, frequencies, and channel bandwidths) and other necessary information (such as timing offsets, coding information, details about the particular radio technology in that channel, search window size, etc.) to assist the access terminal in locating access points from which it can potentially receive radio services.

Neighbor list information is typically provided to the access terminal via (1) a preconfigured database programmed into the access terminal in a static way or (2) overhead signaling messages that are transmitted by some or all of the radio access points located within the general vicinity of the access terminal. These mechanisms for providing neighbor list information to an access terminal are generally implemented on static radio access networks in which the locations of radio access points are either permanently fixed or changed infrequently. Access points belonging to radio access networks that implement either of the above mechanisms for providing neighbor list information often operate across a single radio access technology.

SUMMARY

In general, in one aspect, the invention features methods and computer programs for providing neighbor list information to an access terminal. From an access terminal, a query for potential access points within communication range of the access terminal is received, and neighbor list information is provided to the access terminal. The neighbor list information is associated with available access points capable of providing the access terminal with access to a network.

In general, in another aspect, the invention features methods and computer programs for receiving a list of information pertaining to available access points. From an access terminal, a signal indicative of a request for information about access points located within communication range of the access terminal is sent. At the access terminal, a list of information is received. The list of information is associated with available access points capable of providing the access terminal with access to a network.

In general, in a further aspect, the invention features a system for neighbor list provision. The system includes a server configured to receive from an access terminal, a query for potential access points within communication range of the access terminal. The server is also configured to provide to the access terminal, neighbor list information associated with available access points capable of providing the access terminal with access to a network.

Implementations may include one or more of the following. Receiving a query may include receiving one or more attributes describing communication features particular to the access terminal; and providing neighbor list information may include selecting the neighbor list information based on the one or more attributes. For example, the one or more attributes may include one or more of: a location, an application service requirement, a hardware specification, a hardware identification number of the access terminal, and a user identification number of a user of the access terminal. Providing neighbor list information may include providing radio channels and radio access protocols that are used by the available access points. Providing neighbor list information may also include delivering the neighbor list information to an access point in communication with the access terminal; and instructing the access point to transmit the neighbor list information to the access terminal as an overhead signaling message. Providing neighbor list information may further include delivering the neighbor list information to the access point as an IP message via an access point in communication with the access terminal. Receiving a query may include receiving the query at a server over a network connected to the access terminal and to the server (e.g., using one or more Internet protocols).

In the system, the network may include an Internet; and the server may include an HTTP server hosting a web page that includes the neighbor list information. The access points may include mobile access points. One or more of the available access points may serve a sub-pico cell located in a cell served by an access point with which the access terminal is in communication. Two or more the available access points may use different radio access technologies. A variety of communication protocols may be used for transmitting the query and the neighbor list information between the access terminal and the server. For example, the communication protocols may include HTTP protocols, XML-based protocols, TCP/UDP over IP protocols, SIP messaging, custom-designed protocols, and non-IP-based protocols.

Advantages that can be seen in particular implementations include one or more of the following. An access terminal can dynamically update its current neighbor list information by sending a query to a neighbor list server (e.g., using standard Internet protocols). Updated neighbor list information sent from the neighbor list server to the access terminal can be tailored to the needs of the access terminal based on many different attributes included in the query. The neighbor list server can apply a local policy to determine which potential access points to include in the neighbor list information. The local policy, for example, may select only those potential access points that can provide services that are required by the access terminal. The local policy may also limit the number of access points that are returned to the access terminal based on practical engineering constraints associated with one or both of the access terminal and potential access points. Examples of such engineering constraints include device limitations (e.g., power), signal quality (e.g., signal-to-noise ratio experienced by the access terminal), and data communication overhead limitations (e.g., size of the response message).

Neighbor list information may be frequently updated to provide an access terminal with an accurate list of potential access points of a dynamically changing radio access network. Such radio access networks may include large numbers of cells of varying size that can be added, removed, and modified dynamically. Using the neighbor list information, access terminals that support several different radio access technologies (referred to as "multi-mode" access terminals) can connect to access points that use different radio access technologies.

The details of one or more embodiments of the invention are set forth in the accompanying drawings and the description below. Other features, objects, and advantages of the invention will be apparent from the description and drawings, and from the claims.

DETAILED DESCRIPTION

As discussed above, known methods for providing neighbor list information to an access terminal include pre-programming the information into the access terminal (e.g., during production) and transmitting the information as overhead signaling messages from some or all of the access points. In the latter method, the neighbor list information may be programmed into an access point during the initial setup of the access point. Although these mechanisms are generally adequate for radio access networks that are relatively static in their layout, as the access points of a radio access network are dynamically changed (e.g., added, removed, or modified) and/or configured to support multiple different radio access technologies, the neighbor list information supplied to an access terminal using the conventional mechanisms described above can quickly become outdated.

Here, we describe a system that can frequently update neighbor list information supplied to an access terminal to accommodate dynamic changes in the network and diverse radio access technologies. The system also can tailor list information provided to an access terminal according to various radio access technology requirements of that access terminal.

Figure 1:
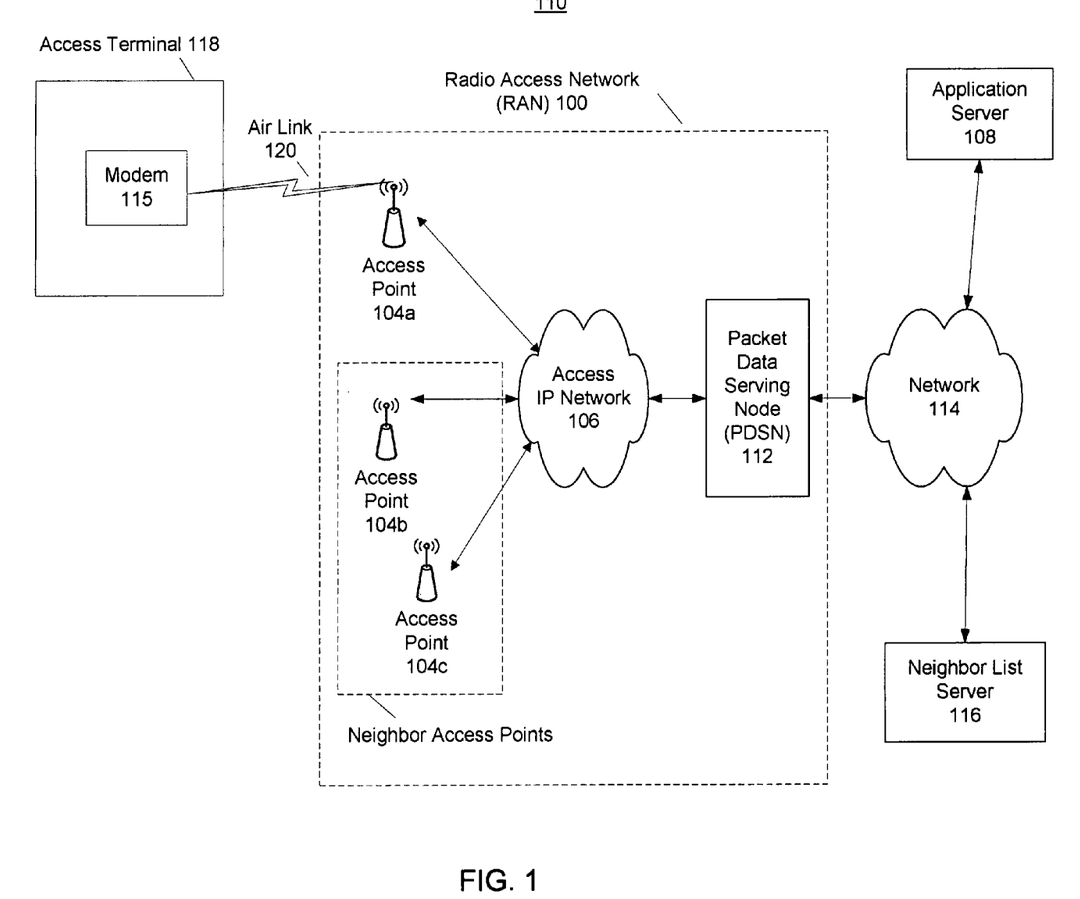
FIG. 1 is a block diagram of a system for providing neighbor list information to an access terminal.

Referring to FIG. 1, a wireless network 110 includes an application server 108, a neighbor list server 116, an external network 114 (e.g., the Internet), a Packet Data Serving Node (PDSN) 112, and a radio access network (RAN) 100 that uses communication protocols to transmit data packets between access terminals (e.g., access terminal 118a) and the external network 114. The RAN 100 is configured to support various mobile wireless access technologies, an example of which is High Data Rate (HDR).

High Data Rate (HDR) is an emerging mobile wireless access technology that enables personal broadband Internet services to be accessed anywhere, anytime (see P. Bender, et al., "CDMA/HDR: A Bandwidth-Efficient High-Speed Wireless Data Service for Nomadic Users", IEEE Communications Magazine, July 2000, and 3GPP2, "Draft Baseline Text for 1xEV-DO," Aug. 21, 2000). Developed by Qualcomm, HDR is an air interface optimized for Internet Protocol (IP) packet data services that can deliver a shared forward link transmission rate of up to 2.46 Mbit/s per sector using only (1X) 1.25 MHz of spectrum. Compatible with CDMA2000 radio access (TIA/EIA/IS-2001, "Interoperability Specification (IOS) for CDMA2000 Network Access Interfaces," May 2000) and wireless IP network interfaces (TIA/EIA/TSB-115, "Wireless IP Architecture Based on IETF Protocols," Jun. 6, 2000, and TIA/EIA/IS-835, "Wireless IP Network Standard," 3rd Generation Partnership Project 2 (3GPP2), Version 1.0, Jul. 14, 2000), HDR networks can be built entirely on IP technologies, all the way from the mobile Access Terminal (AT) to the global Internet, thus taking advantage of the scalability, redundancy and low-cost of IP networks.

Examples of communication protocols used by the RAN 100 include, one of the evolution data-only (1xEV-DO) protocol and other CDMA 2000 protocols. The 1xEV-DO protocol is an evolution of the current 1xRTT standard for high-speed data-only (DO) services and has been standardized by the Telecommunication Industry Association (TIA) as TIA/EIA/IS-856, "CDMA2000 High Rate Packet Data Air Interface Specification", 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification", 3GPP2 C.S0024-A, Version 2.0, June 2005, and is also incorporated herein by reference.

The RAN 100 includes access points 104a-c, an access IP network 106, and a packet data serving node (PDSN) 112. The access points 104a-c facilitate communication between the RAN 100 and access terminals, one of which (i.e., access terminal 118) is shown to be in communication with the access point 104a via an airlink 120. The access IP network 106 is a private network that is designed and operated exclusively for communication between the PSDN 112 and the access points 104a-c. Other radio nodes, devices, and packet networks (not shown in FIG. 1) can be included in the RAN 100.

The external network 114 is a network of devices that use the TCP/IP network protocols to exchange data and can be implemented in a variety of ways. For example, the external network 114 may include any kind and any combination of networks such as an Internet, a local area network (LAN) or other local network, a private network, a public network, a plain old telephone system (POTS), or other similar wired or wireless networks. The external network 114 can also include additional elements such as communication links, proxy servers, firewalls or other security mechanisms, Internet Service Providers (ISPs), gatekeepers, gateways, switches, routers, hubs, client terminals, and other elements. Communications through the external network 114 can include any kind and any combination of communication links such as modem links, Ethernet links, cables, point-to-point links, infrared connections, fiber optic links, wireless links, cellular links, Bluetooth®, satellite links, and other similar links. Communications through the RAN 100, the external network 114, or both may be secured with a mechanism such as encryption, a security protocol, or other type of similar mechanism.

The access terminals, e.g., access terminal 118, are the client-side of the wireless network and Internet protocol, and may be implemented as a mobile device such as a cellular telephone, a wireless PDA, a handheld gaming device, or a wireless laptop computer or a stationary device such as a desktop computer, or other fixed device with which wireless communication is desired. The access terminals may also include embedded devices such as remote sensing devices, electric meters, vending machines, security cameras, remote recording or logging devices, or any device that includes a wireless communications modem.

The access terminal 118 includes a modem 115 for modulating and demodulating transmissions sent and received over the RAN 100. The modem 115 may include multiple modems, each using a different radio access technology. Examples of modem 115 include BREW® modems available from QUALCOMM Inc., or modems based on a Java library or class.

The application server 108 and neighbor list server 116 connect to the network 114 and communicate with the access terminal 118 over the wireless IP network 110. The application server 108 provides wireless services to the access terminal, examples of which include: voice services, circuit data services, and packet data services. In some embodiments, the application server 108 includes multiple servers. The neighbor list server 116 provides neighbor list information to the access terminal 118 via transmissions sent over the external network 114 and the RAN 100. In some embodiments, the application server 108 and the neighbor list server 116 are integrated into a single server.

Figure 2:
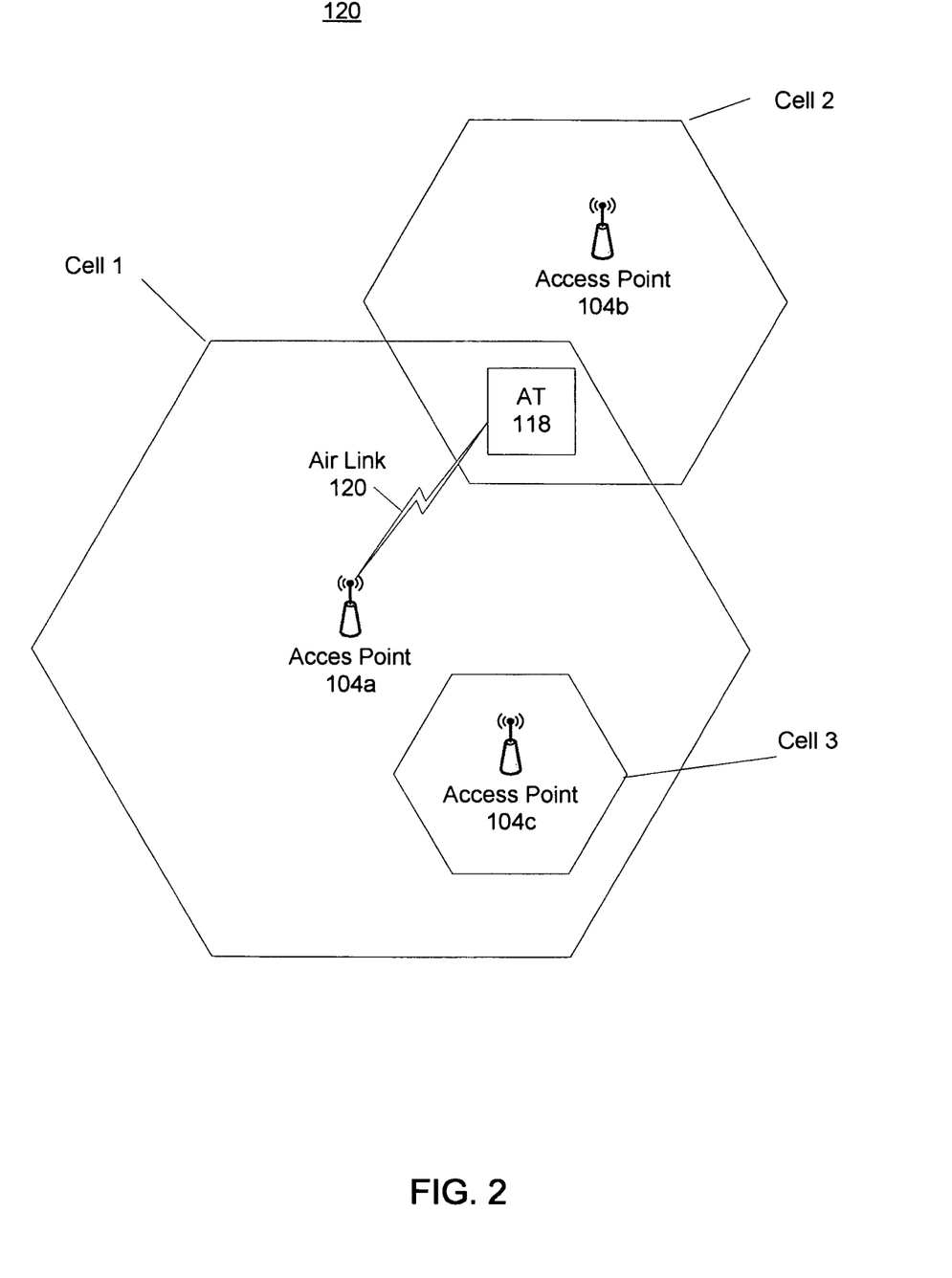
FIG. 2 is a diagram of cells serviced by access points.

Referring to FIG. 2, a geographic area 120 covered by RAN 100 (shown in FIG. 1) is divided into multiple cells, e.g., cells 1-3, that may be further divided into sectors (not shown). Each cell includes one of access points 104a-c that can communicate with access terminals located within each access point's cell. As shown, cell 1 includes the access point 104a, cell 2 includes the access point 104b, and cell 3 includes the access point 104c. Cell 3 is located within cell 1, and cell 1 overlaps with cell 2. Although not drawn to scale, cells 1-3 may serve areas of varying size. For example, in some embodiments, cell 1 is a macro cell serving several city blocks, cell 2 is a pico cell serving an office building, and cell 3 is a sub-pico cell serving a small building, residence, or room. For example, access point 104c may be a mini-base station for use within a home or office. Though access point 104a would generally remain fixed as it serves a large area, one or more of cells 1-3 may be changed in a dynamic fashion. For example, sub-pico cell 3 may frequently move to different geographic locations or be removed and added intermittently from the geographic area 120. Other cells served by additional access points (not shown) may also be added to, removed from, and moved within the geographic area 120. In some embodiments, each of the access points 104a-c uses a directional antenna (not shown) appropriately positioned in each cell to send data to and receive data from access terminals located in the cells.

The access terminal 118 is located within cells 1 and 2 and in communication with access point 104a of cell 1. Although the access terminal 118 is located within both cells 1 and 2, the access terminal 118 may not be aware of the access point 104b if its neighbor list information does not include any information associated with the access point 104b. For example, the access point 104b may be capable of providing the access terminal 118 with a stronger signal, faster data communication speed, and/or more services than the access point 104a, to which the access terminal 118 is connected.

Figure 3:
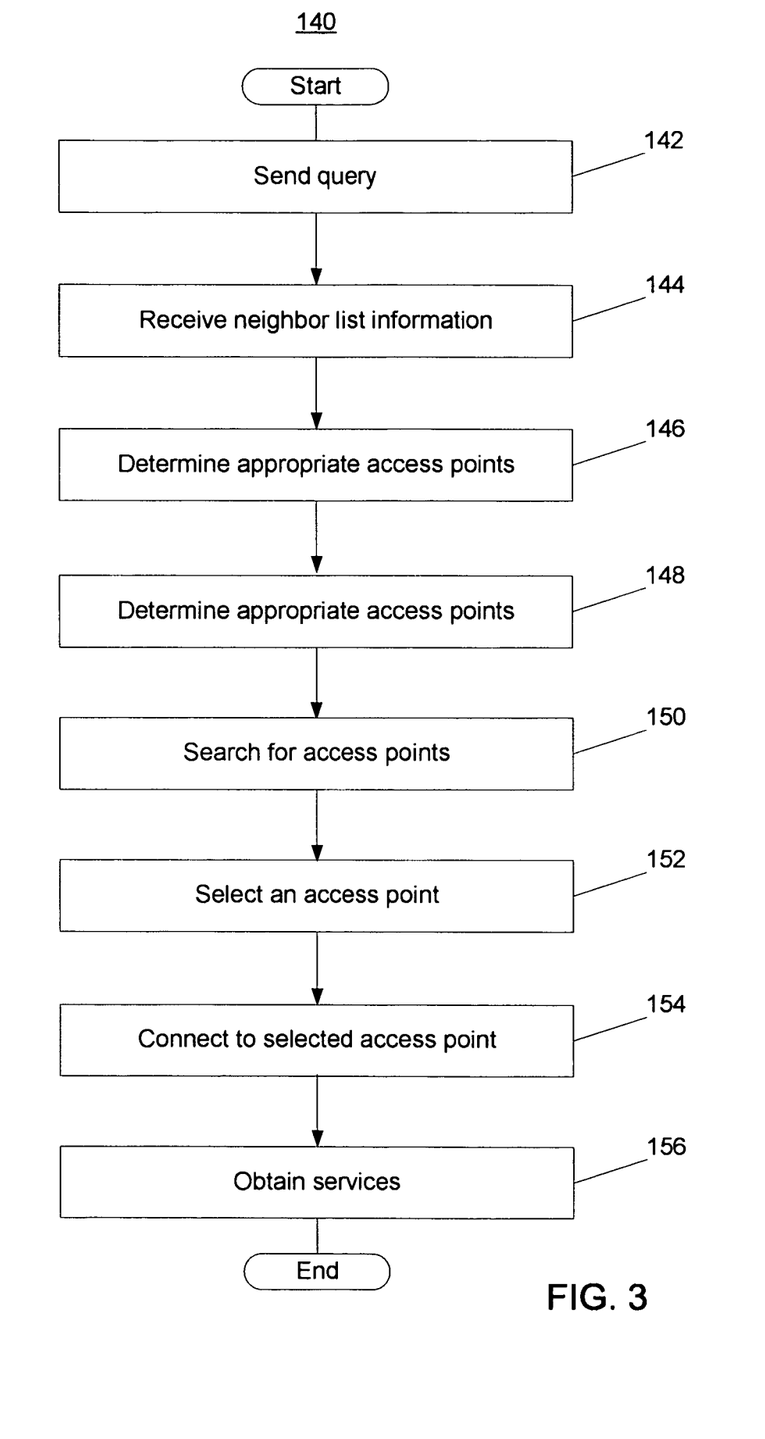
FIG. 3 is a flow diagram of a process performed by an access terminal.

However, unless the access terminal 118 is aware that the access point 104b is within communication range and, in some instances, is capable of providing improved communication services to those of access point 104a, the access terminal 118 will not attempt to connect to the access point 104b. Referring to FIG. 3, the access terminal 118 performs a process 140 for receiving neighbor list information from the neighbor list server 116. The access terminal 118 sends (162) a query sent to the neighbor list server 116 using standard Internet communication protocols (e.g., IP, TCP/UDP, HTTP, and XML). The query may be sent at predetermined times programmed into the access terminal (e.g., every hour) and/or in response to an event. For example, the access terminal 118 may send a query in response to detecting that the signal strength from a current access point has fallen below a predetermined threshold. Similarly, the access terminal 118 may send a query in response to determining that the current access point to which it is connected does not support a communication feature (e.g., text messaging) that a user is attempting to access.

The query includes a request for updated neighbor list information. In some embodiments, the query also includes attributes that define various service requirements and technological requirements that are specific to the access terminal 118. Examples of attributes include a location, application service requirements, hardware capabilities, and a hardware identity of the access terminal 118 and a user identity of the end user who is operating the access terminal 118.

Location attributes may express the location of the access terminal 118 as an IP address, a geographical location, or both. In some embodiments, the location of the access terminal 118 is determined by the identity of other access points that are visible from or within communication range of the access terminal 118. In other embodiments, the location is based on geo-location information known to the access terminal 118 or to the RAN 100. For example, the access terminal 118 or the RAN 100 may be equipped with GPS capability or other geo-location services for determining geographic location.

Attributes pertaining to the application service requirements of the access terminal 118 may include all or a subset of the applications and services that the access terminal 118 is capable of providing to an end user. For example, application-service-requirements attributes may include only those applications and services that are desired by the end user at the time just before the query is sent. Examples of applications and services include voice services, access to the World Wide Web, high-speed data transmission, text messaging, etc.

Attributes defining the hardware capabilities of the access terminal 118 may include each of the radio access technologies supported by the access terminal 118 and the hardware limitations associated with each supported radio access technology. Examples of such limitations include bandwidths, data rates, power classes, and the ability to support radio access operations on multiple radio access technologies concurrently.

Attributes describing the hardware identity of the access terminal 118 may include one or more hardware identifiers (such as a mobile equipment identifier or "MEID") assigned to the access terminal 118. The hardware identifier(s) may be obtained in a secure or insecure manner directly from the access terminal 118 or from the RAN 100.

Similar to the hardware identity attributes, attributes describing the identity of the current end user that is obtaining service with the access terminal 118 may include one or more identifiers associated with the user. Examples of user identifiers include a username, an account number, a UIM identifier, and a SIM card identifier. End-user identifier(s) may be obtained in a secure or insecure manner directly from the access terminal 118 or from the RAN 100.

The access terminal 118 receives access to the external network 114 through its normal radio access procedures and packet data services obtained through access point 104a to which it is connected at the time of sending the query. The query is sent to the neighbor list server 116 using standard or proprietary communication protocols. For example, the access terminal may obtain the location of the neighbor list server 116 dynamically (e.g., using DNS or DHCP communication protocols) or statically (e.g., from a pre-configured IP address programmed into the access terminal 118). The access terminal 118 receives (144) updated neighbor list information from the neighbor list server 116 either immediately or at a later time, depending on how and when the information is delivered.

A variety of communication protocols may be used for transmitting the query and the neighbor list information between the access terminal 118 and the neighbor list server 116. These include, but are not limited to: HTTP protocols, including those that use URLs to identify the neighbor list server 116; application layer protocols including, but are not limited to, XML and XML-based protocols such as SOAP; TCP/UDP over IP protocols, and SIP messaging (e.g., through one or more IMS/MMS network elements). Other possible communication protocols include custom-designed protocols, which may be published or proprietary and non-IP-based protocols (e.g., Layer 3 or upper layer signaling-based protocols of the radio access technology).

The neighbor list information may be transmitted to the access terminal 118 using point-to-point, point-to-multipoint multicast, or point-to-multipoint broadcast versions of the above described protocols. In some embodiments, the neighbor list information may simply be made available on a web page that the access terminal 118 can access over the World Wide Web. In some of these embodiments, the neighbor list server 116 is an HTTP server that hosts the web page containing updated neighbor list information.

Based on the neighbor list information received from the neighbor list server 116 and on any of the access terminal's application policies, the process 140 determines (146) that some or all of the neighboring access points (e.g., access points 104*b-c*) contained in the neighbor list information are appropriate given the hardware requirements, service requirements, and/or other requirements of the access terminal 118. The process 140 passes (147) the neighboring access points to the modem 115 of the access terminal 118. In some embodiments, the process 140 passes (148) the neighbor access points to the radio modems through an Application Program Interface (API). The modem 115 of the access terminal 118 searches (150) for the neighboring access points (in addition to, or instead of the potential access points that have already been obtained by the traditional methods described in the background section) from which the desired application services can be obtained.

From the neighboring access points located in the searching process 150, the access terminal 118 selects (152) an access point with which to connect to the RAN 100. In some embodiments, the access terminal 118 selects the access point that best meets one or more technical specifications. For example, the access terminal 118 may select the access point that has the highest bandwidth, and/or belongs to a particular service provider. In other embodiments, the access terminal 118 selects an access point at random or in a semi-random fashion (e.g., automatically selecting the first access point from a list of appropriate access points).

The access terminal 118 connects (154) to the selected access point and relinquishes the access point 104*a* to which it had been connected. Through the newly established connection with the selected access point, the access terminal 118 obtains (156) wireless services (e.g., voice transmission, text messaging, etc.), one or more of which are provided by the application server 108, in the usual manner according to the procedures that are specified by the one or more radio access technologies being used by the access terminal 118 and supported by the selected access point.

Figure 4:
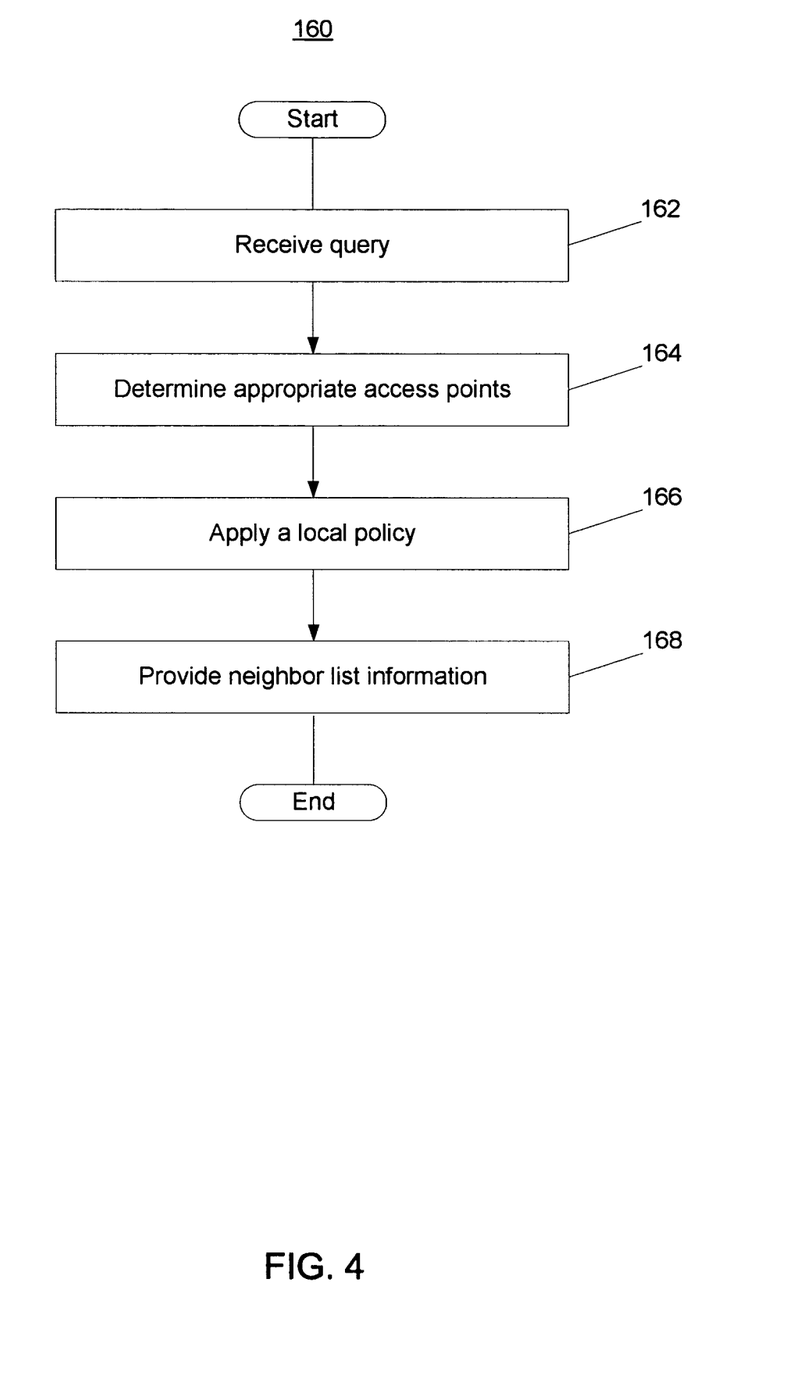
FIG. 4 is a flow diagram of a server process.

Referring to FIG. 4, the neighbor list server 16 performs a process 160 for providing neighbor list information to the access terminal 18. The neighbor list server 116 receives (162) the query sent to it by the access terminal 118 (step 142 of FIG. 3). As described above, the query attributes that define various service requirements and technological requirements that are specific to the access terminal 118.

Based on the attributes contained in the query, the neighbor list server 116 determines (164) those potential neighboring access points that meet some or all of the access terminal's technological and service requirements. The neighbor list server 116 optionally applies (166) a local policy to determine which of the potential neighboring access points determined in step 164 should be returned to the access terminal 118.

The local policy may eliminate one or more of the potential neighboring access points based on one or more technical considerations, legal constraints, business constraints, and other criteria and considerations. Examples of such criteria and considerations include: the identity of the device or user and whether or not it has been authenticated; the eligibility of the access terminal 118 or of the user to obtain service from certain potential neighboring access points (e.g., does the access terminal 118 or user have rights granted by the owner or service provider to access certain radio access points); the time of day or date on which the query is sent; the ability or eligibility of the potential neighboring radio access points to provide the services that are required or requested by the access terminal 118; and the current location of the access terminal 118. The local policy may also limit the number of neighboring access points that can be returned to the access terminal 118. In some embodiments, the number of neighboring access points may be limited based on priorities governing which potential neighboring access points are eligible to serve the access terminal. For example, access points that are capable of supporting particularly high bandwidths and/or a large variety of services may be available only to users who subscribe to more expensive service plans. In some embodiments, the number of neighboring access points may be limited based on practical engineering constraints such as their current usage by other access terminals (e.g., potential access points that are already serving many other access terminals may be eliminated from consideration). Other practical engineering constraints that may limit the number of potential neighboring access points returned to the user include device limitations and data communication overhead limitations (e.g., the size of the message that includes the neighbor list information).

The neighbor list server 116 provides (168) neighbor list information to the access terminal 118. The neighbor list information includes a list of the potential neighboring access points to be returned to the access terminal 118, as determined by the local policy in step 166. In some embodiments, the neighbor list server 116 transmits the neighbor list information to the access terminal 118 through the same application layer protocols used by the access terminal 118 to send the query to the neighbor list server 116 (step 140 of FIG. 3). In other embodiments, the neighbor list server 116 uses different application layer protocols.

Figure 5A:
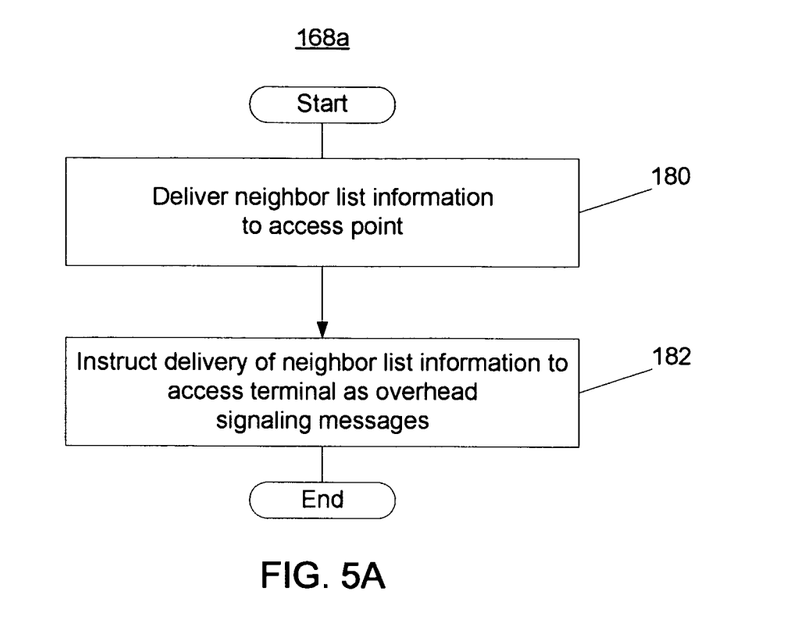
FIGS. 5A and 5B are flow diagrams of processes for delivering neighbor list information from a server to an access terminal.
Figure 5B:
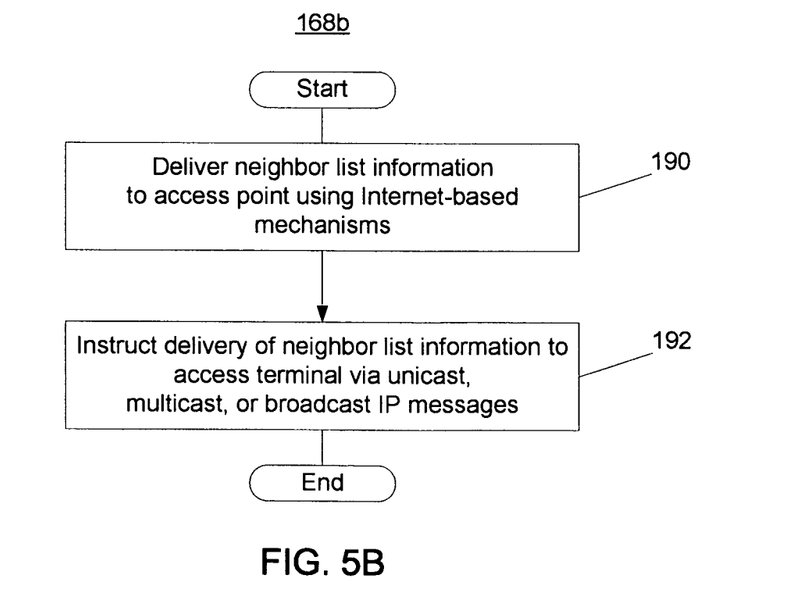

Referring to FIGS. 5A and 5B, two different approaches 168*a* and 168*b* for providing (168) neighbor list information from the neighbor list server 116 to the access terminal 118 are described. In the first approach 168*a* depicted in FIG. 5A, the neighbor list server 116 delivers (180) the neighbor list information to the access point 104*a* to which the access terminal 118 is connected. In some embodiments, the neighbor list server 116 additionally (or alternatively) delivers the neighbor list information to the other access points within the vicinity of the access point 104a. The server 116 instructs (182) the access points that have received the neighbor list information to deliver the information to the access terminal as overhead signal messages. The access points may use multiple access technologies to deliver the overhead signaling messages to the access terminal 118. Furthermore, other access terminals within the vicinity of the access points may also receive the overhead signal messages containing the neighbor list information.

In a second approach 168b, depicted in FIG. 5B, the neighbor list server 116 provides (168) the neighbor list information to the access terminal 118 through Internet-based (e.g., packet data service) mechanisms (e.g., HTTP/XML response messages). The neighbor list server 116 sends (190) the neighbor list information to the access point 104a to which the access terminal 118 is connected. No other access points receive the neighbor list information from the sever 116. The neighbor list server 116 instructs (192) the access point 104a to deliver the neighbor list information to the access terminal 118 via unicast, multicast, or broadcast IP messages.

As described above with respect to FIG. 3, the access terminal 118 receives the neighbor list information and uses this information to choose an appropriate access point from which to obtain services over the wireless network 110 (FIG. 1).

Although the techniques described above employ the 1×EV-DO air interface standard, the techniques are also applicable to other CDMA and non-CDMA air interface technologies in which an access terminal communicates with a server over a wireless network.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The requesting and delivering of neighbor list information may occur over another non-wireless network or a different wireless network from the one to which the neighbors apply. For example, a device could be connected to an Ethernet network or WiFi (wireless fidelity) wireless network, request and obtain the neighbor list information, and then use that neighbor list information to assist in its operation on the cellular network or, in general, any wireless network.

Neighbor list information may not be restricted to one wireless communication protocol. For example, the neighbor list that may be applicable to CDMA 1×, 1×EV-DO, WiMax, UMTS, GSM, or any subset of these technologies and include rules for determining neighbors within one or more of those technologies and rules that determine when and how the access terminal can or should perform handoffs from one technology to another.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. The following are examples for illustration only and not to limit the alternatives in any way. The techniques described herein can be performed in a different order and still achieve desirable results.

What is claimed is:

1. A method comprising:
   generating, for an access terminal at a geographic location, a neighbor list of first access points in a network, with the first access points in the neighbor list being within a communication range of the access terminal at the geographic location;
   wherein the first access points in the neighbor list have an absence of support for a communication feature to be accessed by the access terminal at the geographic location;
   receiving, at least partly based on the absence of support for the communication feature, a query for an update to the neighbor list to include first other access points that support the communication feature at the geographic location;
   determining, in response to the query, one or more second access points in the network that support the communication feature at the geographic location, with the one or more second access points being within the communication range of the access terminal at the geographic location;
   updating the neighbor list with the one or more second access points in the network that support the communication feature at the geographic location;
   delivering the update to the neighbor list to second other access points in a vicinity of an access point in communication with the access terminal; and
   instructing the second other access points in the vicinity to use one or more access technologies to deliver the update to the neighbor list to the access terminal as one or more overhead signaling messages;
   wherein at least one of the first access points in the neighbor list differs from at least one of the one or more second access points in the update to the neighbor list.

2. The method of claim 1, wherein the first access points in the neighbor list satisfy one or more criteria.

3. The method of claim 2, wherein the one or more criteria comprise one or more of:
   a location, an application service requirement, a hardware specification, a hardware identification number of the access terminal, and a user identification number of a user of the access terminal.

4. The method of claim 1, further comprising:
   providing the neighbor list by providing one or more of radio channel information and radio access protocol information.

5. The method of claim 1, further comprising:
   delivering the neighbor list to a third access point configured to communicate with the access terminal; and
   instructing the third access point to transmit the neighbor list to the access terminal as an overhead signaling message.

6. The method of claim 1, further comprising:
   delivering the neighbor list to a third access point located in a communication range of one of the first access points; and
   causing the neighbor list to be broadcast to other access terminals via the third access point.

7. The method of claim 1, wherein receiving the query comprises receiving the query over the network.

8. The method of claim 7, wherein receiving the query over the network comprises receiving the query using one or more Internet protocols.

9. A system comprising:
   one or more processors; and
   one or more tangible computer-readable media configured to store instructions that are executable by the one or more processors to perform operations comprising:
   generating, for an access terminal at a geographic location, a neighbor list of first access points in a network, with the first access points in the neighbor list being within a communication range of the access terminal at the geographic location;
   wherein the first access points in the neighbor list have an absence of support for a communication feature to be accessed by the access terminal at the geographic location;
   receiving, at least partly based on the absence of support for the communication feature, a query for an update to the neighbor list to include first other access points that support the communication feature at the geographic location;
   determining, in response to the query, one or more second access points in the network that support the communication feature at the geographic location, with the one or more second access points being within the communication range of the access terminal at the geographic location;
   updating the neighbor list with the one or more second access points in the network that support the communication feature at the geographic location;
   delivering the update to the neighbor list to second other access points in a vicinity of an access point in communication with the access terminal; and
   instructing the second other access points in the vicinity to use one or more access technologies to deliver the update to the neighbor list to the access terminal as one or more overhead signaling messages;
   wherein at least one of the first access points in the neighbor list differs from at least one of the one or more second access points in the update to the neighbor list.

10. The system of claim 9, wherein at least one of the first access points in the neighbor list comprises a mobile access point.

11. The system of claim 9, wherein at least one of the first access points in the neighbor list is configured to serve a sub-pico cell.

12. The system of claim 9, wherein one of the first access points in the neighbor list is configured to use a first radio access technology, and wherein another one of the first access points in the neighbor list is configured to use a second, different radio access technology.

13. The system of claim 9, wherein the first access points in the neighbor list satisfy one or more criteria.

14. The system of claim 13, wherein the one or more criteria comprise one or more of: a location, an application service requirement, a hardware specification, a hardware identification number of the access terminal, and a user identification number of a user of the access terminal.

15. The system of claim 9, wherein the operations further comprise:
   generating a web page that comprises information indicative of the update to the neighbor list.

16. The system of claim 9, wherein a plurality of communication protocols are used for transmitting the neighbor list, and wherein the plurality of communication protocols comprises at least one of:
   HTTP protocols, XML-based protocols, TCP/UDP over IP protocols, SIP messaging, custom-designed protocols, and non-IP-based protocols.

17. One or more non-transitory computer readable media configured to store instructions that are executable by one or more processors to perform operations comprising:
- generating, for an access terminal at a geographic location, a neighbor list of first access points in a network, with the first access points in the neighbor list being within a communication range of the access terminal at the geographic location;
- wherein the first access points in the neighbor list have an absence of support for a communication feature to be accessed by the access terminal at the geographic location;
- receiving, at least partly based on the absence of support for the communication feature, a query for an update to the neighbor list to include first other access points that support the communication feature at the geographic location;
- determining, in response to the query, one or more second access points in the network that support the communication feature at the geographic location, with the one or more second access points being within the communication range of the access terminal at the geographic location;
- updating the neighbor list with the one or more second access points in the network that support the communication feature at the geographic location;
- delivering the update to the neighbor list to second other access points in a vicinity of an access point in communication with the access terminal; and
- instructing the second other access points in the vicinity to use one or more access technologies to deliver the update to the neighbor list to the access terminal as one or more overhead signaling messages;
- wherein at least one of the first access points in the neighbor list differs from at least one of the one or more second access points in the update to the neighbor list.

18. The one or more non-transitory computer readable media of claim 17, wherein the first access points in the neighbor list satisfy one or more criteria.

19. The one or more non-transitory computer readable media of claim 18, wherein the one or more criteria comprise one or more of:
- a location, an application service requirement, a hardware specification, a hardware identification number of the access terminal, and a user identification number of a user of the access terminal.

20. The one or more non-transitory computer readable media of claim 17, wherein the neighbor list comprises one or more of radio channel information and radio access protocol information.

21. The one or more non-transitory computer readable media of claim 17, wherein the operations further comprise:
- delivering the neighbor list to a third access point configured to communicate with the access terminal; and
- instructing the third access point to transmit the neighbor list to the access terminal as an overhead signaling message.

22. The one or more non-transitory computer readable media of claim 17, wherein the operations further comprise:
- delivering the neighbor list to a third access point located in a communication range of one of the first access points; and
- causing the neighbor list to be broadcast to other access terminals via the third access point.

23. The method of claim 1, wherein the one or more second access points in the network that support the communication feature are potential neighboring access points, and wherein the method further comprises:
- eliminating one or more of the potential neighboring access points based on an eligibility of the access terminal to obtain service from the potential neighboring access points, wherein the eligibility is based on whether the access terminal has rights granted by service providers to access the potential neighboring access points;
- wherein updating comprises:
  - updating the neighbor list with remaining potential neighboring access points.

* * * * *